(12) United States Patent
Cornea et al.

(10) Patent No.: US 10,102,020 B2
(45) Date of Patent: Oct. 16, 2018

(54) METHODS, SYSTEMS, AND COMPUTER READABLE MEDIA FOR VIRTUAL MACHINE (VM) DEPLOYMENT USING READ-ONLY MEMORY

(71) Applicant: Ixia, Calabasas, CA (US)

(72) Inventors: Tudor Cornea, Bucharest (RO); George Comanescu, Bucharest (RO); Adrian Stanciu, Bucharest (RO); Konstantin Belov, Thousand Oaks, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 27 days.

(21) Appl. No.: 14/598,188

(22) Filed: Jan. 15, 2015

(65) Prior Publication Data
US 2016/0203016 A1    Jul. 14, 2016

(30) Foreign Application Priority Data
Jan. 9, 2015    (RO) .............................. A/00006/2015

(51) Int. Cl.
*G06F 12/00* (2006.01)
*G06F 9/455* (2018.01)
*G06F 12/02* (2006.01)

(52) U.S. Cl.
CPC ...... *G06F 9/45558* (2013.01); *G06F 12/0238* (2013.01); *G06F 2009/4557* (2013.01); *G06F 2009/45562* (2013.01); *G06F 2009/45583* (2013.01); *G06F 2212/202* (2013.01)

(58) Field of Classification Search
CPC ............. G06F 9/45558; G06F 12/0238; G06F 2009/45562; G06F 2009/45583; G06F 2212/202; G06F 2009/4557
USPC ...................................... 711/162, 102; 713/1
See application file for complete search history.

(56) References Cited

U.S. PATENT DOCUMENTS

| | | | |
|---|---|---|---|
| 7,356,679 B1* | 4/2008 | Le ..................... | G06F 17/30067 707/E17.01 |
| 7,890,723 B2 | 2/2011 | LaPedis et al. | |
| 8,387,048 B1* | 2/2013 | Grechishkin ....... | G06F 9/45533 718/1 |
| 2014/0149983 A1* | 5/2014 | Bonilla ............... | G06F 9/45558 718/1 |
| 2014/0281304 A1* | 9/2014 | Hoffman ............. | G06F 9/45558 711/162 |
| 2015/0156203 A1* | 6/2015 | Giura ................... | H04L 63/101 726/4 |

OTHER PUBLICATIONS

"IX Chariot—Solution Brief," Ixia, 915-3034-01 Rev. D, pp. 1-2, www.ixiacom.com (Feb. 2014).
"IxVM," Ixia, web.archive.org/web/20130902225026/http://www.ixiacom.com/products/network_test/applications/ixvm/?print=1 (Sep. 2, 2013).

* cited by examiner

*Primary Examiner* — Mardochee Chery

(57) ABSTRACT

Methods, systems, and computer readable media for deploying a virtual machine (VM) are disclosed. According to one exemplary method, the method includes receiving a request for creating a VM. The method also includes creating the VM using a VM operating system (OS) stored in a read-only memory, wherein the read-only memory is shared among a plurality of VMs.

18 Claims, 3 Drawing Sheets

METHODS, SYSTEMS, AND COMPUTER READABLE MEDIA FOR VIRTUAL MACHINE (VM) DEPLOYMENT USING READ-ONLY MEMORY

PRIORITY CLAIM

This application claims the benefit of Romanian Patent Application No. A/00006/2015, filed Jan. 9, 2015; the disclosure of which is incorporated herein by reference in its entirety.

TECHNICAL FIELD

The subject matter described herein relates to computing virtualization. More specifically, the subject matter relates to methods, systems, and computer readable media for deploying a virtual machine (VM).

BACKGROUND

A data center is a facility used to house computer systems and associated components (e.g., storage systems). Data centers typically provide high reliability and security and typically include resources shared by multiple customers of the data center operator. Large data centers are industrial scale operations using as much electricity as a small town. Various data centers may utilize virtualization. For example, a physical server in a data center may implement multiple virtual machines (VMs), e.g., virtual servers, using a physical server or node in the data center. In this example, each VM may execute an operating system and other software, where each VM may appear as a physical server to end users.

Generally, when one or more VMs are implemented on a physical server, a hypervisor is used to manage and facilitate the VMs. For example, a hypervisor can emulate various hardware features available to the VMs. In this example, software (e.g., an operating system) executing on the VM may have access to hardware, such as video, keyboard, storage, and/or network interfaces, emulated by the hypervisor. The hypervisor may also segregate the VMs from each other such that an operation within one VM is kept within that VM and is not visible to or modifiable from another VM.

Conventional VM deployment generally suffers from speed and scalability issues. In particular, conventional VM deployments generally require a significant amount of time, resources, and/or expertise.

Accordingly, a need exists for improved methods, systems, and computer readable media for deploying a VM.

SUMMARY

Methods, systems, and computer readable media for deploying a virtual machine (VM) are disclosed. According to one exemplary method, the method includes receiving a request for creating a VM. The method also includes creating the VM using a VM operating system (OS) stored in a read-only memory, wherein the read-only memory is shared among a plurality of VMs.

According to one exemplary system, the system includes a read-only memory and a computing platform configured to receive a request for creating a VM and to create the VM using a VM OS stored in the read-only memory, wherein the read-only memory is shared among a plurality of VMs.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors, network interfaces, and memory.

As used herein, each of the terms 'function', 'engine', and 'module' refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for deploying a virtual machine (VM). Conventional VM deployment typically involves a hypervisor or other entity creating one or more VM, where each VM is allocated a separate memory portion for storing a VM operating system (OS) and/or other information. However, issues can arise when the number of VMs is significant. In particular, a VM OS and/or other information may be copied and stored into a relevant memory portion for each VM, which can significantly impact deployment time and memory resources as the number of VMs increase.

In accordance with some aspects of the subject matter described herein, techniques for VM deployment may include creating one or more VMs that use read-only (RO) memory for some data (e.g., a VM OS) and, optionally, read-write (RW) memory for other data (e.g., logs, scripts, configuration information, and/or persistent information). In some embodiments, the RO memory may be shared among a plurality of VMs. In some embodiments, the RW memory may be thin provisioned, e.g., allocated on an as-needed basis.

In accordance with some aspects of the subject matter described herein, various optimizations may be utilized for improving VM creation and/or deployment time. For example, using a shared RO memory (SROM) and thin-provisioned RW memories, a VM deployment time associated with aspects of the present subject matter may be almost one order of magnitude (e.g., seven to ten times) faster. Further, such optimization are not limited to a particular environment or hardware, and may be applicable in any scenario where similar VMs are to be deployed quickly and/or with minimal impact on memory resources (e.g., storage space).

In accordance with some aspects of the subject matter described herein, techniques for VM deployment may include updating one or more VMs that use RO memory by modifying the RO memory, e.g., by modifying a VM OS stored in an SROM via a hypervisor. By modifying the RO memory (e.g., via a hypervisor), connectivity with one or more VMs can be optional during the updating, thereby allowing VM updates to be performed more efficiently.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
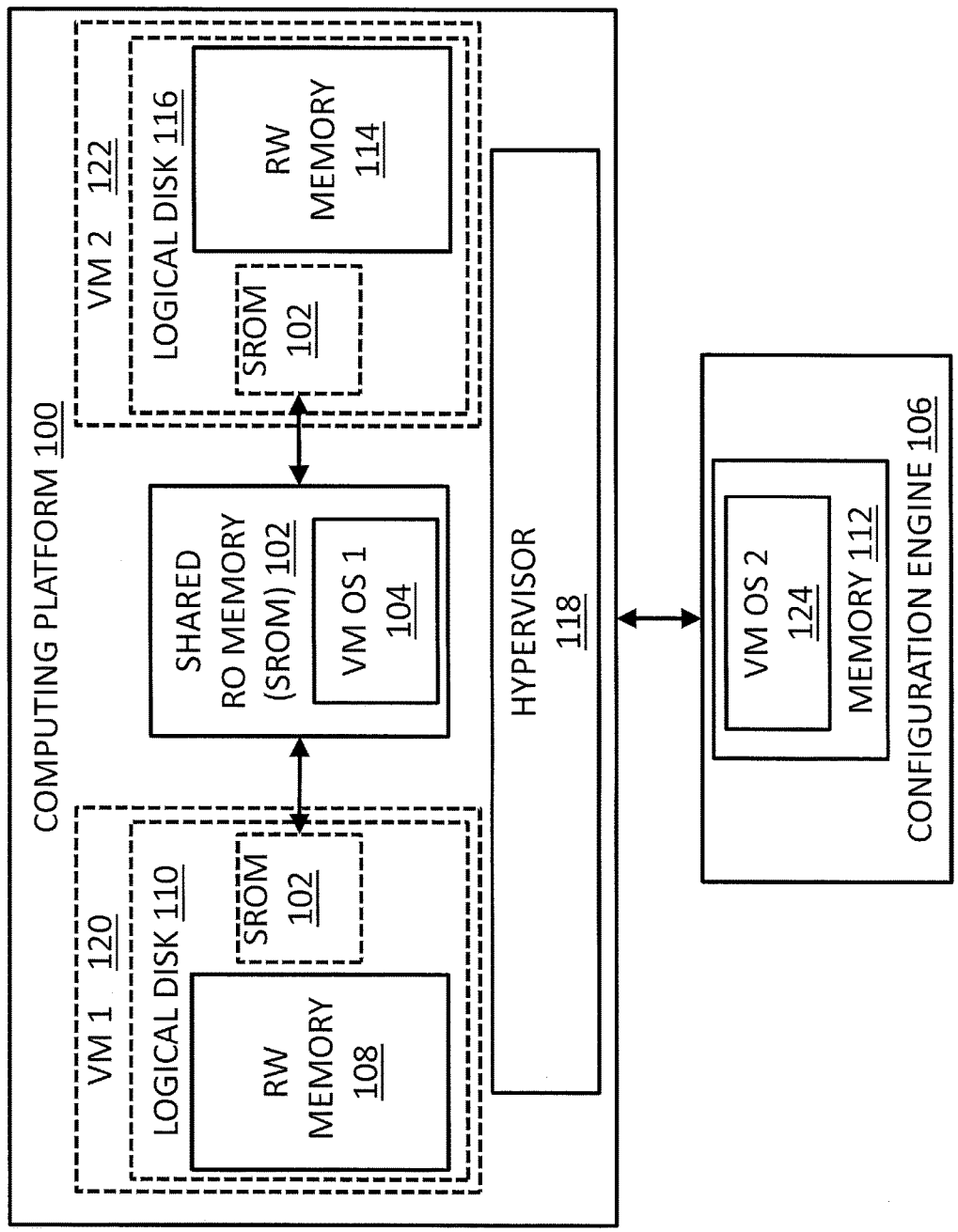
FIG. 1 is a diagram illustrating an exemplary computing platform for deploying a virtual machine (VM) according to an embodiment of the subject matter described herein.

FIG. 1 is a diagram illustrating an exemplary computing platform 100 for deploying a VM according to an embodiment of the subject matter described herein. Computing platform 100 may represent any suitable entity or entities (e.g., a testing platform, a test tool, a device, a node, and/or one or more computing platforms) for providing various virtualization related resources, such as one or more servers, hypervisors, VMs, virtual routers, virtual switches, and/or other "cloud" or data center related resources. In some embodiments, computing platform 100 may be configured to perform one or more aspects associated with testing one or more devices, networks, or services. In some embodiments, computing platform 100 may be a stand-alone tool, a testing device, or software executing on a processor or across multiple processors. In some embodiments, computing platform 100 may be a single node or may be distributed across multiple computing platforms or nodes.

In some embodiments, computing platform 100 may include functionality for communicating with configuration engine 106 and/or various entities. Configuration engine 106 may represent any suitable entity (e.g., a node, module, or device) for generating and/or sending configuration information associated with VMs or related resources. For example, configuration engine 106 may provide a communications interface or console for communicating with a user (e.g., a test operator or a VM administrator). In this example, the user may select and/or determine various VM related settings and/or related configurations for VM deployment, e.g., at computing platform 100.

Configuration engine 106 may include a memory 112. Memory 112 may represent any suitable entity (e.g., a non-transitory computer readable medium or a memory device) for storing data associated with VM deployment and/or VM related configuration information. For example, memory 112 may include a VM OS 124 and/or other information. In this example, when initiating VM creation and/or VM updates, configuration engine 106 may send VM OS 124 and/or other information stored in memory 112 to computing platform 100.

Computing platform 100 may include a hypervisor 118, a VM 1 120, and a VM 2 122. Hypervisor 118 may represent any suitable entity for managing (e.g., creating, deleting, migrating, restarting, and/or stopping VMs) and/or facilitating VM 1 120 and VM 2 122. For example, hypervisor 118 may allocate and/or emulate physical resources associated with VM 1 120 and VM 2 122. In this example, hypervisor 118 may be configured for receiving commands from a hypervisor controller (e.g., configuration engine 106) or other entity that instructs hypervisor 118 on how to manage and/or configure VM 1 120 and VM 2 122.

Each of VM 1 120 and VM 2 122 may represent any suitable entity (e.g., software executing on a processor) for emulating a computing system. Each of VM 1 120 and VM 2 122 may be associated with physical and/or virtual resources for executing a VM OS and/or other software associated with emulating a computing system and/or performing related functionality. For example, hypervisor 118 may configure VM 1 120 and VM 2 122 for emulating web servers and/or for performing web server functionality, e.g., receiving hypertext transfer protocol (HTTP) requests and providing HTTP responses.

VM 1 120 may include or access a logical disk 110. Logical disk 110 may represent any suitable entity for providing storage for information associated with VM 1 120. For example, logical disk 110 may represent a logical device containing one or more portions of one or more physical memory devices. In this example, each portion of logical disk 110 may be configured differently and/or comprise different types of storage mediums, e.g., random-access memory (RAM), flash memory, compact discs (CDs), or physical disks.

Logical disk 110 may include an SROM 102, also referred to as an RO logical disk, and an RW memory 108, also referred to as an RW logical disk. SROM 102 may represent any suitable entity (e.g., one or more computer readable mediums or portions thereof) for storing data. In some embodiments, SROM 102 may be shared among multiple VMs, e.g., VM 1 120 and VM 2 122. In some embodiments, SROM 102 may be configured to allow or perform memory read operations but not memory write operations. For example, SROM 102 may be mounted as a read-only storage such that no data stored therein can be modified and no additional data may be written to SROM 102. In this example, SROM 102 may avoid file system corruptions or other issues associated with storage that allows memory write operations.

In some embodiments, SROM 102 may be thick provisioned. For example, hypervisor 118 may provision VM 1 120 with two gigabytes (GBs) of SROM 102. In this example, the storage associated with SROM 102 may be reserved or allocated and/or formatted, e.g., with lazy zeros or eager zeros, physical storage at creation and/or prior to use. In another example, where SROM 102 is shared among a plurality of VMs, hypervisor 118 may configure VM 1 120 to use a pre-existing (e.g., pre-allocated and/or pre-formatted) SROM 102.

RW memory 108 may represent any suitable entity (e.g., one or more computer readable mediums or portions thereof) for storing data associated with VM 1 120. RW memory 108 may be configured to allow or perform memory read operations and memory write operations. For example, logs associated with VM performance may be written to RW memory 108 and may be read from RW memory 108.

VM 2 120 may include or access a logical disk 116. Logical disk 116 may represent any suitable entity for providing storage for information associated with VM 2 122. For example, logical disk 116 may represent a logical device containing one or more portions of one or more physical memory devices. Logical disk 116 may include an RW memory 114 and SROM 102. In some embodiments, SROM 102 may be shared among VM 1 120 and VM 2 122. In some embodiments, each of VM 1 120 and VM 2 122 may include a separate or distinct RO memory that can perform memory read operations. RW memory 114 may represent any suitable entity (e.g., one or more computer readable mediums or portions thereof) for storing data associated with VM 2 122. RW memory 114 may be configured to allow or perform memory read operations and memory write operations.

In some embodiments, RW memory 108 and/or RW memory 114 may be thin provisioned, e.g., disk space may not be allocated upfront. For example, at creation, hypervisor 118 may provision VM 1 120 with four GBs of RW memory 108; but may not actually allocate four GBs of physical storage to VM 1 120. Instead, in this example, hypervisor 118 may allocate 200 megabytes (MBs) of the four GBs provisioned and may allocate more physical storage as needed, e.g., in chunks of 200 MBs as memory usage reaches a utilization threshold (e.g., 90% of RW memory is used).

In some embodiments, RW memory 108 and/or RW memory 114 may be located on a different storage device and/or a different storage type than SROM 102. For example, hypervisor 118 may create 20 VMs, where each VM use SROM 102, but each uses a separate RW memory. In this example, SROM 102 may include flash memory or RAM, while each RW memory may include a portion of storage area associated with a physical disk. In another example, where each VM use SROM 102, but each VM uses a separate RW memory, SROM 102 may include physical disk storage and each RW memory may include a portion of storage area in flash memory. In this example, each RW memory may be thin provisioned and disk size associated with each RW memory may depend on how much information is being written. In some embodiments, if storage usage for a particular RW memory becomes too large, some additional storage space may be allocated, e.g., from a different storage device or a different type of storage device.

In some embodiments, RW memory 108, RW memory 114, and/or SROM 102 may include persistent memory, non-volatile memory, and/or memory configured to store information persistently. For example, RW memory 108 may store information that can be retrieved even if VM 1 120 and/or computing platform 100 are rebooted (e.g., restarted).

In some embodiments, RW memory 108, RW memory 114, and/or SROM 102 may include non-persistent memory, volatile memory, and/or memory configured to store information for a short amount of time. For example, RW memory 108 may store information that can be retrieved during a current VM session but that cannot be retrieved if VM 1 120 and/or computing platform 100 are rebooted (e.g., restarted).

In some embodiments, SROM 102 may include or store VM OS 104 and/or other information usable by VM 1 120 and/or VM 2 122. For example, where SROM 102 is shared by VM 1 120 and VM 2 122, each VM may execute VM OS 104 or instances thereof from SROM 102.

In some embodiments, VM OS 104 and/or other VM related software may be stored as an image or file in SROM 102 or a repository. For example, VM OS 104 may represent a particular version or type of Linux OS, such as CentOS, and/or components (e.g., software) for performing one or more VM related functions.

In some embodiments, where multiple VMs share (e.g., boot from) SROM 102, memory resources may be conserved. For example, if configuration engine 106 instructs hypervisor 118 to generate one hundred VMs including one GB of identical data, hypervisor 118 may store the one GB of data in SROM 102, and may configure each of the one hundred VMs to use SROM 102. In this example, by sharing an SROM 102, hypervisor 118 may conserve about 99 GBs of data compared to the amount of storage used if hypervisor 118 copies one GB of data to a separate storage area for each VM.

In some embodiments, where multiple VMs share SROM 102, VM creation and/or deployment time may be significantly reduced. For example, by sharing SROM 102 among multiple VMs, hypervisor 118 may save time by not having to copy information stored in SROM 102 to a separate storage area for each VM being created. In this example, assuming that 100 VMs are to be created and that copying information stored in SROM 102 requires ten seconds for each copy operation, hypervisor 118 may complete the VM creation procedure 990 seconds (e.g., around sixteen minutes) faster than techniques that use separate storage areas.

In some embodiments, where multiple VMs share SROM 102, the time required for performing a VM update may be significant reduced. For example, during an update process for VM 1 120 and VM 2 122, hypervisor 118 may obtain (e.g., from configuration engine 106) a different VM OS 124 and may overwrite and/or replace VM OS 104 stored in SROM 102 with VM OS 124. In this example, connectivity with either VM 1 120 or VM 2 122 may not be required. Instead, after modifying SROM 102, each VM may be restarted (e.g., by hypervisor 118) such that, after the restart, each VM uses VM OS 124 or an instance thereof. By not communicating with VM 1 120 and VM 2 122, the update process may be completed more efficiently since an update requesting entity (e.g., configuration engine 106) communicates with a single entity (e.g., hypervisor 118) instead of each VM separately.

In some embodiments, one or more unifying techniques may be usable for presenting a RO memory (e.g., SROM 102) and a RW memory (e.g., RW memory 108) as a single file system, a storage device, a disk, and/or a directory tree. For example, VM 1 120 and/or VM OS 104 may be configured to use a union mount, e.g., a Union FS file system, to mesh together SROM 102 and RO memory 108 as a single, unified directory tree. In this example, VM 1 120 and/or VM OS 104 may monitor, and, if necessary, may redirect memory related operations to RW memory 108, e.g., such that users are unaware of the different capabilities or configurations of the underlying memories.

In some embodiment, by using a union mount and/or other unifying techniques, memory write operations may be performed (e.g., via by or at RW memory 108 or RW memory 114) for each VM, thereby allowing a user to customize a particular VM, and not corrupt other VMs. Further, by using such unifying techniques, a user may perform VM customization (e.g., writing user test scripts or maintaining performance logs) without knowing a mount point associated with a respective RW memory.

It will be appreciated that FIG. 1 is for illustrative purposes and that various depicted entities, their locations, and/or their functions described above in relation to FIG. 1 may be changed, altered, added, or removed. For example, configuration engine 106 may be located at computing platform 100 or at a separate and/or distinct node from computing platform 100.

Figure 2:
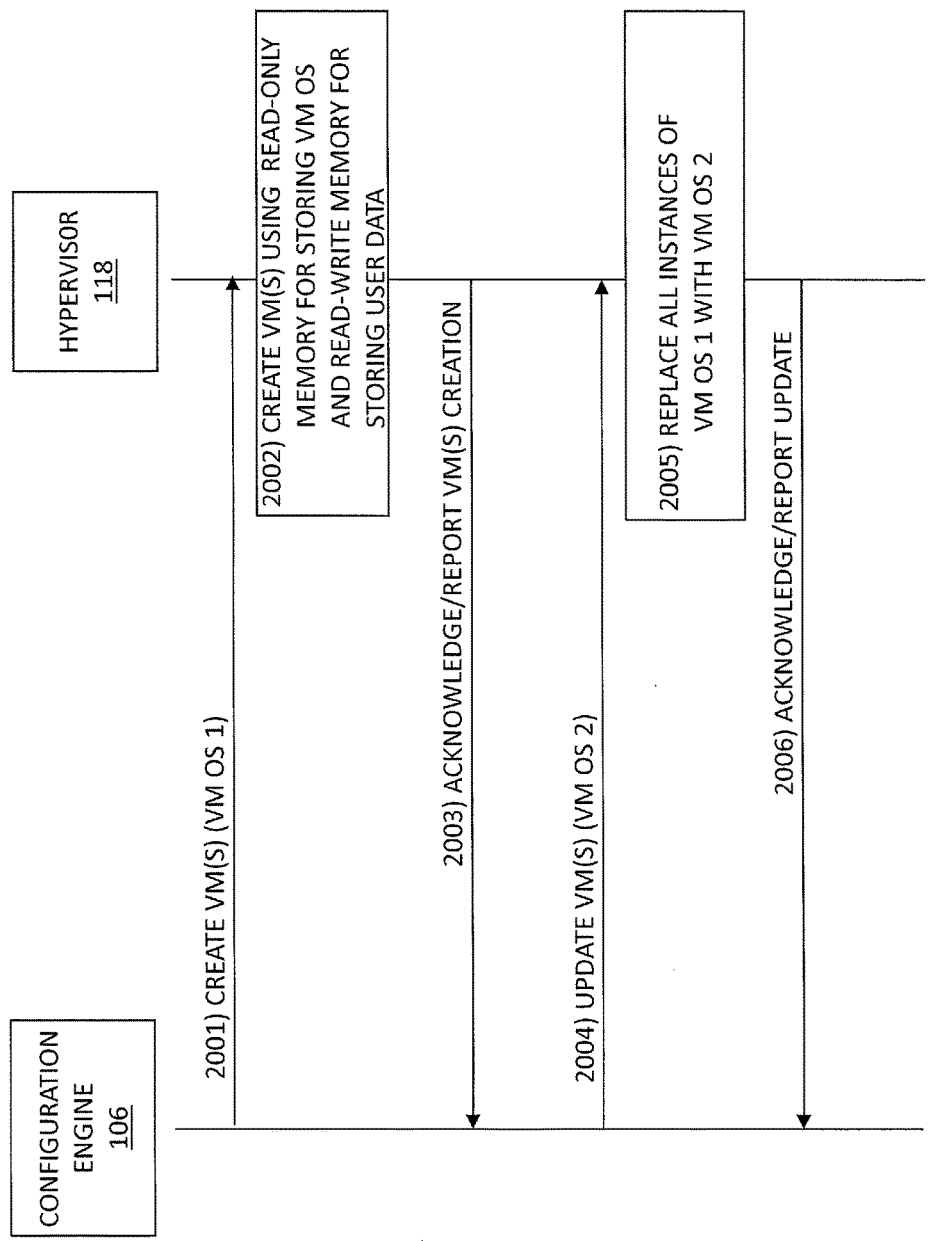
FIG. 2 is a diagram illustrating exemplary communications associated with VM deployment according to an embodiment of the subject matter described herein.

FIG. 2 is a diagram illustrating exemplary communications associated with VM deployment according to an embodiment of the subject matter described herein. In some embodiments, configuration engine 106 or another entity (e.g., a test operator or user) may interact with computing platform 100. For example, configuration engine 106 may generate commands that instruct hypervisor 118 to perform VM deployment and/or other actions, such as VM updates and/or VM migrations.

Referring to FIG. 2, at step 2001, a message for creating one or more VMs may be sent from configuration engine 106 to hypervisor 118. For example, a create VM(s) message may indicate that two VMs are to be created, where each VM is to execute VM OS 104 or an instance thereof.

At step 2002, in response to receiving the message, hypervisor 118 may create one or more VMs, where each of the one or more VMs may use an RO memory (e.g., SROM 102) for storing VM OS 104 and an RW memory for storing user data and/or other information. For example, hypervisor 118 may create VM 1 120 configured to use SROM 102 and RW memory 108 and may create VM 2 122 configured to use SROM 102 and RW memory 114.

At step 2003, after the one or more VMs are created and/or deployed, a message for acknowledging or reporting the creation of the one or more VMs may be sent from hypervisor 118 to configuration engine 106.

At step 2004, a message for updating one or more VMs may be sent from configuration engine 106 to hypervisor 118. For example, an update VM(s) message may indicate that two VMs are to be updated with VM OS 124.

At step 2005, in response to receiving the message, hypervisor 118 may update the one or more VMs by replacing all instances of a current VM OS with a different VM OS. For example, hypervisor 118 may replace VM OS 104 in SROM 102 with VM OS 124. In this example, after replacing VM OS 104 in SROM 102 with VM OS 124, hypervisor 118 may restart any affected VMs such that, when restarted, each VM uses VM OS 124. Since hypervisor 118 modifies information stored in SROM 102, the one or more VMs may be updated without the VMs needing to communicate with configuration engine 106.

At step 2006, after the one or more VMs are updated, a message for acknowledging or reporting the updating of the one or more VMs may be sent from hypervisor 118 to configuration engine 106.

It will be appreciated that the communications and/or actions depicted in FIG. 2 are for illustrative purposes and that different and/or additional communications and/or actions than those depicted in FIG. 2 may be used for VM deployment and/or VM updates. It will also be appreciated that various communications and/or actions described herein may occur concurrently or in a different order or sequence.

Figure 3:
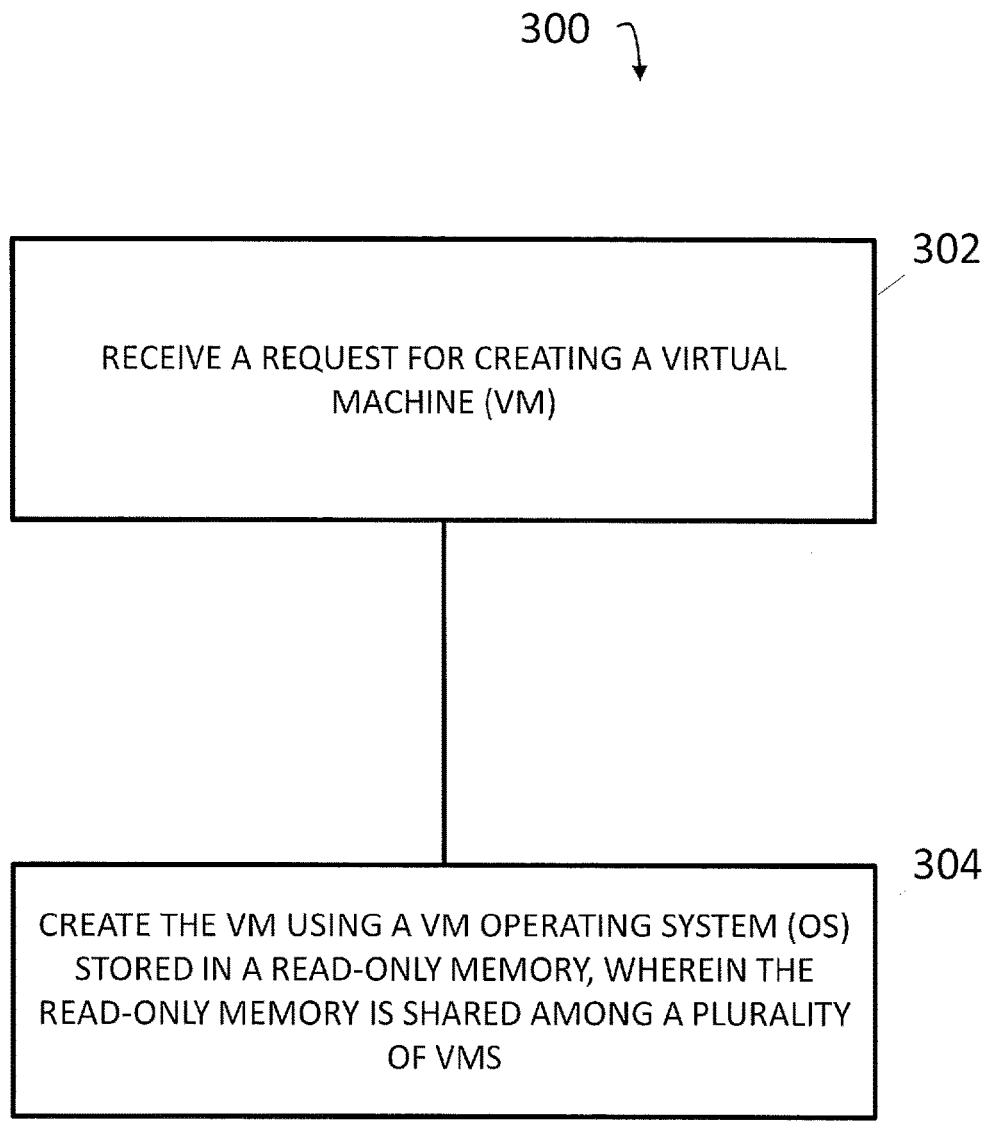
FIG. 3 is a diagram illustrating an exemplary process for deploying VM according to an embodiment of the subject matter described herein.

FIG. 3 is a diagram illustrating an exemplary process 300 for deploying a VM according to an embodiment of the subject matter described herein. In some embodiments, exemplary process 300, or portions thereof, may be performed by or at computing platform 100, configuration engine 106, and/or another node or module. In some embodiments, exemplary process 300 may include steps 302 and/or 304.

Referring to process 300, at step 302, a request for creating a VM may be received. For example, hypervisor 118 or another entity at computing platform 100 may receive a request for creating VM 1 120 from configuration engine 106.

At step 304, the VM may be created using a VM OS stored in a RO memory, where the RO memory may be shared among a plurality of VMs. For example, hypervisor 118 may create VM 1 120 and may configure VM 1 120 to share SROM 102 and/or to execute instances of VM OS 104 stored thereon In this example, SROM 102 may be shared among a VM 1 120 and VM 2 122.

In some embodiments, a VM (e.g., VM 1 120 and/or VM 2 122) may be configured to use an RW memory (e.g., RW memory 108 and/or RW memory 114) for storing user information, logs, user scripts, or persistent information. For example, hypervisor 118 may create VM 1 120 may configure VM 1 120 to use SROM 102 for executing instances of VM OS 104 stored therein. In this example, VM 1 120 may also be configured to use a separate and/or distinct RW memory for storing data, e.g., system logs or user-generated information.

In some embodiments, a VM (e.g., VM 1 120 and/or VM 2 122) may be updated by modifying an RO memory (e.g., SROM 102 or other RO memory). In such embodiments, connectivity with the VM may be optional during the updating. For example, configuration engine 106 may send VM OS 124 to hypervisor 118 and hypervisor 118 may replace VM OS 104 stored in SROM 102 with VM OS 124. In this example, configuration engine 106 may not communicate with any affected VMs directly. Instead, configuration engine 106 may request or instruct hypervisor 118 to update the VMs and hypervisor 118 may restart the VMs after performing the update.

In some embodiments, a VM (e.g., VM 1 120 and/or VM 2 122) may be configured to use a union mount or other technique for presenting an RO memory and an RW memory as one logical disk or one file system to a user. For example, by using a union mount, VM 1 120 may present SROM 102 and RW 108 as a single file system and/or storage area. In this example, from a user's perspective, the user appears to be interacting with a single file system or a single storage area.

In some embodiments, memory write operations are redirected to an RW memory (e.g., RW memory 108 and/or RW memory 114). For example, VM OS 104 or another entity associated with VM 1 120 may be configured to automatically redirect memory write operations to RW memory 108. In this example, VM OS 104 or another entity associated with VM 1 120 may allow memory read operations to be handled by the appropriate memory, e.g., either RW memory 108 or SROM 102. In another example, instead of using union mounts (e.g., where VM OS 104 redirects memory write operations), individual applications associated with VM 1 120 may be aware of RW memory 108 and SROM 102 and may direct or redirect memory write operations and/or memory read operations to the appropriate storage.

In some embodiments, an RO memory (e.g., SROM 102 or other RO memory) may include a computer readable medium configured for allowing memory read operations but not memory write operations.

In some embodiments, an RW memory (e.g., RW memory 108 and/or RW memory 114) may include a computer readable medium configured for allowing memory read operations and memory write operations.

In some embodiments, an RW memory (e.g., RW memory 108 and/or RW memory 114) or an RO memory (e.g., SROM 102 or other RO memory) may include a persistent memory, e.g., a non-volatile random-access memory (NVRAM).

In some embodiments, an RW memory (e.g., RW memory 108 and/or RW memory 114) may be thin provisioned such that storage space is allocated on an as-needed basis.

It will be appreciated that exemplary process 300 is for illustrative purposes and that different and/or additional actions may be used. It will also be appreciated that various actions described herein may occur in a different order or sequence.

It should be noted that configuration engine 106, computing platform 100, and/or functionality described herein may constitute a special purpose computing device. Further, configuration engine 106, computing platform 100, and/or functionality described herein can improve the technological field of testing network nodes by providing mechanisms for deploying one or more VMs that use RO memory, e.g., SROM 102, and, optionally, RW memory.

The subject matter described herein for deploying a VM improves the functionality of test platforms and/or test tools by providing mechanisms for deploying one or more VMs that use RO memory, e.g., SROM 102, and, optionally, RW memory. Further, by using an RO memory to store VM OS 104 or other information, one or more VMs may be quickly deployed (e.g., seven to ten times faster than conventional techniques that do not use RO memory). It should also be noted that a computing platform that implements subject matter described herein may comprise a special purpose computing device usable to deploy a VM and/or update a VM.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for deploying a virtual machine, the method comprising:
   at a computing platform comprising a hypervisor:
      receiving a request for creating a virtual machine (VM) from a hypervisor controller;
      creating the VM using a VM operating system (OS) stored in a read-only memory, wherein the read-only memory is shared among a plurality of VMs;
      receiving a request for updating the plurality of VMs from the hypervisor controller; and
      updating the plurality of VMs without the hypervisor controller communicating with the plurality of VMs directly by overwriting or replacing the VM OS in the read-only memory with a different VM OS via the hypervisor, wherein connectivity with the plurality of VMs is not required during the updating, wherein each of the plurality of VMs is restarted after the updating by the hypervisor and wherein each of the plurality of VMs uses the different VM OS after the updating.

2. The method of claim 1 wherein the VM is configured to use a read-write memory for storing user information, logs, user scripts, or persistent information.

3. The method of claim 2 wherein the VM is configured to use a union mount or other technique for presenting the read-only memory and the read-write memory as one logical disk or one file system to a user.

4. The method of claim 2 wherein memory write operations are redirected to the read-write memory.

5. The method of claim 1 wherein the read-only memory includes a non-transitory computer readable medium configured for allowing memory read operations but not memory write operations.

6. The method of claim 2 wherein the read-write memory includes a non-transitory computer readable medium configured for allowing memory read operations and memory write operations.

7. The method of claim 2 wherein the read-write memory or the read-only memory includes a persistent memory.

8. The method of claim 2 wherein the read-write memory is thin provisioned such that storage space is allocated on an as-needed basis.

9. A system for deploying a virtual machine, the system comprising:
   a read-only memory;
   a hypervisor; and
   a computing platform comprising the hypervisor, the computing platform configured to receive a request for creating a VM from a hypervisor controller, to create the VM using a VM OS stored in the read-only memory, wherein the read-only memory is shared among a plurality of VMs; to receive a request for updating the plurality of VMs from the hypervisor controller; and to update the plurality of VMs without the hypervisor controller communicating with the plurality of VMs directly by overwriting or replacing the VM OS in the read-only memory with a different VM OS via the hypervisor, wherein connectivity with the plurality of VMs is not required during the updating, wherein each of the plurality of VMs is restarted after the updating by the hypervisor and wherein each of the plurality of VMs uses the different VM OS after the updating.

10. The system of claim 9 wherein the VM is configured to use a read-write memory for storing user information, logs, user scripts, or persistent information.

11. The system of claim 10 wherein the VM is configured to use a union mount or other technique for presenting the read-only memory and the read-write memory as one logical disk or one file system to a user.

12. The system of claim 10 wherein the VM is configured to redirect memory write operations to the read-write memory.

13. The system of claim 9 wherein the read-only memory includes a non-transitory computer readable medium configured for allowing memory read operations but not memory write operations.

14. The system of claim 10 wherein the read-write memory includes a non-transitory computer readable medium configured for allowing memory read operations and memory write operations.

15. The system of claim 10 wherein the read-write memory includes a persistent memory.

16. The system of claim 10 wherein the read-write memory is thin provisioned such that storage space is allocated on an as-needed basis.

17. A non-transitory computer readable medium comprising computer executable instructions embodied in the non-transitory computer readable medium that when executed by a processor of a computer perform steps comprising:
   at a computing platform comprising a hypervisor:
      receiving a request for creating a virtual machine (VM) from a hypervisor controller;
      creating the VM using a VM operating system (OS) stored in a read-only memory, wherein the read-only memory is shared among a plurality of VMs;
      receiving a request for updating the plurality of VMs from the hypervisor controller; and
      updating the plurality of VMs without the hypervisor controller communicating with the plurality of VMs directly by overwriting or replacing the VM OS in the read-only memory with a different VM OS via the hypervisor, wherein connectivity with the plurality of VMs is not required during the updating, wherein each of the plurality of VMs is restarted after the updating by the hypervisor and wherein each of the plurality of VMs uses the different VM OS after the updating.

18. The non-transitory computer readable medium of claim 17 wherein the VM is configured to use a read-write memory for storing user information, logs, user scripts, or persistent information.

\* \* \* \* \*